(12) United States Patent
Murakami et al.

(10) Patent No.: US 6,940,205 B1
(45) Date of Patent: Sep. 6, 2005

(54) PERMANENT MAGNET SYNCHRONOUS MOTOR

(75) Inventors: Hiroshi Murakami, Osaka (JP); Yukio Honda, Osaka (JP); Shizuka Yokote, Osaka (JP); Yoshinari Asano, Fukui (JP); Yukitoshi Wada, Osaka (JP); Hideo Hirose, Osaka (JP); Yasuaki Matsushita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/520,149

(22) Filed: Mar. 7, 2000

Related U.S. Application Data

(63) Continuation-in-part of application No. PCT/JP98/03996, filed on Sep. 7, 1998.

(30) Foreign Application Priority Data

Sep. 8, 1997 (JP) ................................. 9-242939
Sep. 8, 1997 (JP) ................................. 9-242940

(51) Int. Cl.$^7$ ............................ H02K 1/27; H02K 3/04
(52) U.S. Cl. ...................... 310/254; 310/179; 310/216; 310/156.01; 310/162
(58) Field of Search ................................ 310/156, 179, 310/254

(56) References Cited

U.S. PATENT DOCUMENTS 1,761,836 A * 6/1930 MacFarlane et al. ........ 310/186
5,191,256 A * 3/1993 Reiter, Jr. et al. ...... 310/156.49
6,194,800 B1 * 2/2001 Maruyama et al. ........ 310/90.5
6,218,753 B1 * 4/2001 Asano et al. ................ 310/156

FOREIGN PATENT DOCUMENTS

| EP | 0642210 A1 * | 3/1995 |
|---|---|---|
| JP | 62-114454 | 5/1987 |
| JP | 3-60852 | 6/1991 |
| JP | 5-304737 | 11/1993 |
| JP | 6-66277 | 9/1994 |
| JP | 6-245418 | 9/1994 |
| JP | 8-251891 | 9/1996 |
| JP | 8-331823 | 12/1996 |
| JP | 9-056099 | 2/1997 |
| JP | 9-182331 | 7/1997 |
| WO | 94/22206 | 9/1994 |

* cited by examiner

Primary Examiner—Darren Schuberg
Assistant Examiner—J. Aguirrechea
(74) Attorney, Agent, or Firm—Wenderoth, Lind & Ponack, L.L.P.

(57) ABSTRACT

The present invention provides a permanent-magnet-synchronous-motor having a stator with concentrating windings with the following structure so that permanent magnet (6) is hard to subjected to demagnetization magnetic field: 0.3 Lg<La≦2.0 Lg, where La is a clearance between teeth of stator (1), and Lg is an air-gap between stator (1) and rotor (2), and yet outer walls of both ends of the permanent magnet (6) disposed within rotor (2) in a rim direction are tapered toward inside from a rotor rim in a radial direction and thus form recessed section on the outer walls of the magnets. As a result, withstanding force against demagnetization is expected to increase.

5 Claims, 16 Drawing Sheets

PERMANENT MAGNET SYNCHRONOUS MOTOR

This application is a continuation-in-part application of International Application PCT/JP98/03996, filed Sep. 7, 1998, which is hereby incorporated by reference.

TECHNICAL FIELD

The present invention relates to permanent magnet synchronous motors, and particularly relates to a permanent magnet synchronous motor having a stator with concentrated windings.

BACKGROUND ART

A high power permanent magnet synchronous motor, in general, uses numbers of teeth of a stator and employs a distributed winding method so that the composite magnetomotive force of this motor can approximately form a sine wave. Permanent magnets of the rotor of this synchronous motor employs magnets made of rare-earth material featuring a high density of magnetic flux as well as large withstanding forces against demagnetization. Further, a sensor detects a rotational phase of the rotor so that the current phase can be controlled responsive to a rotor position.

However, the distributed winding method requires complicated winding processes, and this lowers winding-efficiency. The rare earth magnet and the sensor detecting the rotational phase are expensive, and these elements boost the cost of this motor.

An inexpensive permanent magnet synchronous motor is thus developed as shown in FIG. 17(a) in order to overcome the problems discussed above. Stator 21 is formed by cores 22 (refer to FIG. 17(b)) divided corresponding to respective teeth. Teeth 26 of divided cores 22 are wound with insulating paper 28, and coils are wound on top of that, thereby forming concentrated winding coils 23. Divided cores 22 with the concentrated windings are incorporated into a ring and fixed by welding, caulking or laser-beam-welding to form the stator having the concentrated windings. Permanent magnets 25 of rotor 24 are made of inexpensive-ferrite magnet. Regarding the current-phase control, a zero-cross point of an inductive voltage produced by a neutral coil which allows no driving current to run through—is detected so that 120 excitation can be executed by rectangular waveforms.

In this permanent magnet synchronous motor, 3 n (n=a natural number) pieces of teeth of stator 21 are arranged at equal intervals and the teeth are coupled with each other to form three phases through "Y" letter connecting method. Permanent magnets with 2n (n= a natural number) poles are arranged to face stator 21. As such, it is preferable to prepare 2n poles of permanent magnets for 3 n pieces of teeth in the permanent magnet synchronous motor.

In the example shown in FIG. 17, a number of poles of rotor 24 is 8 poles (2n, n=4), a number of stator teeth is 12 (3n, n=4). Respective teeth are wound with coils u1, v1, w1, u2 . . . . v4, w4 sequentially. Each coil is connected in series as shown in FIG. 18(a) or in parallel as in FIG. 18(b) to form phases U, V and W.

Meanwhile, in an ordinary permanent magnet synchronous motor, the following relation is established so that leakage flux between each tooth can be reduced: La>approx. 2 Lg, (refer to FIG. 19) where La is a clearance between teeth 26 and 26, and Lg is an air gap between stator 21 and rotor 24.

Permanent magnets 25 have even thickness from the first end to the second end in a circumference direction, and magnets 25 are arranged so that each end thereof faces another adjacent end. However, if this structure is applied to the inexpensive permanent magnet synchronous motor as discussed above, the permanent magnets encounter local demagnetization due to the following reason, whereby a desirable output cannot be produced by the motor.

Since the motor employs the concentrated winding method, a tooth bears a different pole from that of its adjacent tooth, thereby increasing inductance. This situation allows the rotor to be subject to demagnetization. In particular, when the motor is in a sensor-less operation, the permanent magnets of the rotor tend to be demagnetized at starting or at out-of-sync condition. In other words, as shown in FIG. 20, stator coil 23 produces a pole counteracting a pole of permanent magnet 25 of rotor 24, and parts of magnetic field produced by coil 23 invade permanent magnets 25 as demagnetizing magnetic field 27. When permanent magnets 25 are made of ferrite magnet, demagnetizing magnetic field 27 renders magnets 25 into break down condition. As a result, magnets 25 are demagnetized.

Numbers of motors with concentrated windings have been available in the market. However, a clearance between teeth is so narrow that the permanent magnets are subject to demagnetization when the polarities of adjacent teeth are opposite each other. When the permanent magnet made of ferrite having small coercive force is used, the withstanding force against demagnetization becomes poor. When the motor is in the sensor-less operation in particular, reverse magnetic field is applied to the permanent magnets at staring or out-of-sync condition, thereby demagnetizing the permanent magnets with ease.

The present invention addresses the problems discussed above, and aims to provide a permanent magnet synchronous motor, in which the concentrated winding method is employed and yet the withstanding force of the permanent magnets against demagnetization is enhanced.

SUMMARY OF THE INVENTION

In a permanent magnet synchronous motor of the present invention with a stator having concentrated windings, the following relation is established:

0.3 Lg<La≦2.0 Lg, where La is a clearance between respective teeth, and Lg is an air gap between the stator and rotor.

Since the clearance between teeth is set at not more than two times the air gap Lg, demagnetizing magnetic flux is restrained from flowing toward the rotor. Further, when polarities of the coil and rotor oppose each other, the rotor magnets are not easily subjected to the demagnetizing magnetic field. As a result, the withstanding force against the demagnetization is enhanced. Meanwhile, when La is too small, the leakage magnetic flux between teeth becomes greater. However, edges of the stator may interfere with each other due to mold errors produced when divided cores are manufactured. Therefore, La is desirably greater than 0.3 Lg.

Another relation such as 2 Lg<Lb<5 Lg is established so that the demagnetizing magnetic flux can flow toward the teeth and can be restrained from flowing toward the rotor, where Lb is a depth of the stator edge and Lg is an air gap between the stator and rotor. As a result, the same effect as discussed above can be expected. Meanwhile, when Lb is too large, the leakage magnetic flux to be shorted grows too large, thereby lowering the motor output. Therefore, Lb is desirably set at smaller than 5 Lg. Further, when the two relations discussed above are satisfied, the greater withstanding force against demagnetization is obtainable.

In an edge of tooth of the stator, i.e., the edge of the trailing side in the rotating direction of the rotor out of the edges of teeth opposing each other, or both of these edges, the side facing the rotor is cut away so that an air gap on the tooth edge can be enlarged, and this can restrain the demagnetizing magnetic flux from flowing toward the rotor. As a result, the same effect discussed above is obtainable. Further, in this case, at the edge of the tooth where the rim side facing the rotor has been cut away, the other side of the rotor protrudes so that the depth of the tooth edge is maintained, and this can restrain the demagnetizing magnetic flux from running toward the rotor. As a result, the withstanding force against the demagnetization can be further enhanced. When the three conditions discussed above are satisfied, the greater withstanding force against the demagnetization is obtainable.

When the permanent magnets of the rotor are made of ferrite magnet, which is less expensive than rare earth magnet and vulnerable to demagnetization, the structure discussed above can enhance the withstanding force of the inexpensive permanent magnets against the demagnetization. Therefore, an outstanding effect can be produced in this case. The stator formed by the divided cores realizes independent and efficient winding on respective divided cores before they are assembled into the stator. This can substantially increase the productivity and lower the cost. If this structure is applied to the motor driven by the sensor-less mechanism, an outstanding effect is expected because the sensor-less operation, in general, is vulnerable to demagnetization. In addition to the effects discussed above, when this permanent magnet synchronous motor is employed in compressors of air-conditioners or electric refrigerators, substantial effects are obtainable by lowering the costs of these appliances.

BRIEF DESCRIPTIONS OF DRAWINGS

FIG. 9(a) through FIG. 9(c) are cross sections of respective modifications, FIG. 9(d) is a cross sectional enlarged view of an important part shown in FIG. 9(a).

FIG. 10(a) through FIG. 10(c) are cross sections of respective modifications, FIG. 10(d) is a cross sectional enlarged view of an important part shown in FIG. 10(a).

FIG. 17(a) is a cross section of the motor and FIG. 17(b) is a perspective view of a divided core of the motor.

DETAILED DESCRIPTION OF THE INVENTION

Exemplary Embodiment 1

The first exemplary embodiment of the present invention is demonstrated hereinafter with reference to FIG. 1 and FIG. 2.

Figure 1:
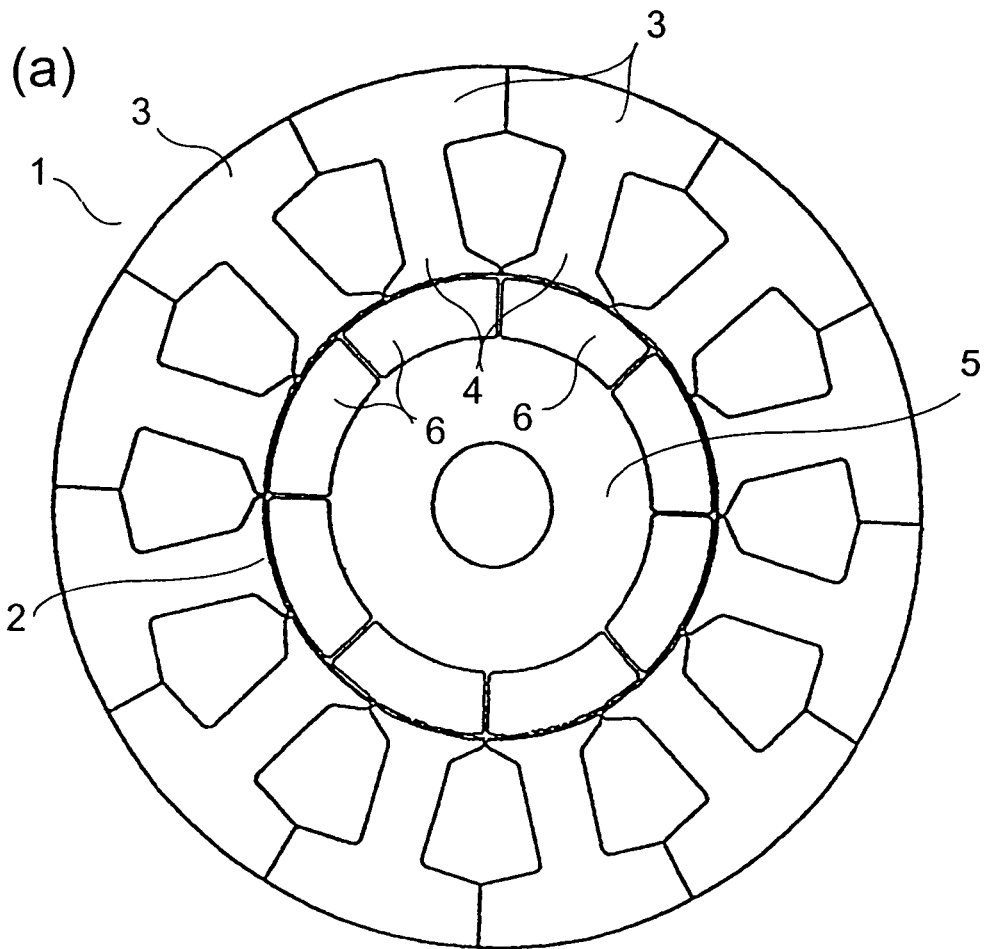
FIG. 1(a) is a cross section of a permanent magnet synchronous motor in accordance with a first exemplary embodiment of the present invention.
FIG. 1(b) is an enlarged view of an important part of the motor.
Figure 1:
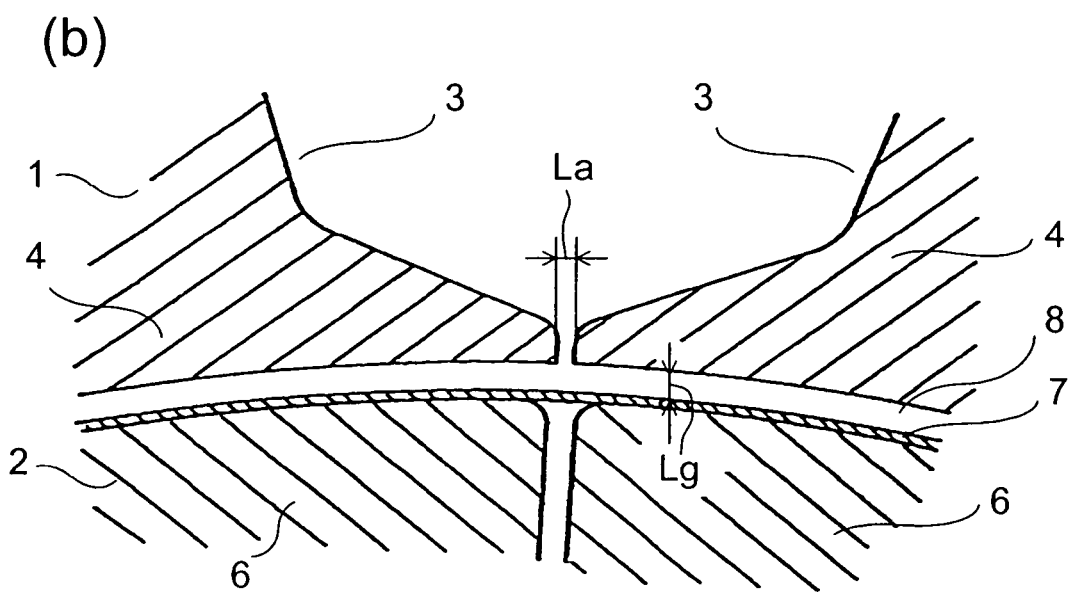

In FIG. 1, stator 1 comprises divided cores 3 in a quantity corresponding to a number of slots. Teeth 4 of respective divided cores 3 are wound with coils (not shown) independently, i.e., the concentrated winding method is employed. Rotor 2 comprises rotor core 5 formed of laminated silicon steel sheet and permanent magnets 6 made of plurality of ferrite magnets, where magnets 6 are fixedly mounted to the outer wall of rotor core 5. A rotary shaft (not shown) extending through and fixed to the center of rotor core 5 is journaled by a bearing. Hollow cylinder 7 made of stainless steel sheet is fit onto the outer wall of rotor 2, or a reinforcing tape is wound around the outer wall so that necessary strength against centrifugal force is obtained.

The motor shown in the drawing has four pairs of polarity (=n), rotor 2 has eight permanent magnets (=2 n), and stator 1 comprises 12 pieces of divided cores 3 (=3 n). Regarding the current control of the coils wound on stator 1, a zero-cross point of an inductive voltage-produced by a neutral coil which allows no driving current to run through—is detected so that 120° excitation can be executed by rectangular waveforms. As illustrated in FIG. 1(b), teeth clearance La is set to meet the relation of 0.3 Lg<La≦2.0 Lg, where La= clearance between teeth 4 and 4, and Lg=air gap 8 between stator 1 and rotor 2.

Preferable values of Lg ranges 0.4–0.6 mm, and those of La ranges 0.3–1.2 mm.

In the construction discussed above, teeth clearance La between the adjacent teeth edges is set at not greater than two times the air-gap Lg. Therefore, this structure allows leakage flux to flow toward the adjacent teeth and thus restrains the leakage flux from flowing toward rotor 2. Even if the coil on stator 1 is at a position to counteract the polarity of rotor 2, the polarity of rotor 2 is difficult to be subject to demagnetization. The withstanding force of permanent magnet 6 on rotor 2 against the demagnetization is thus increased.

Figure 2:
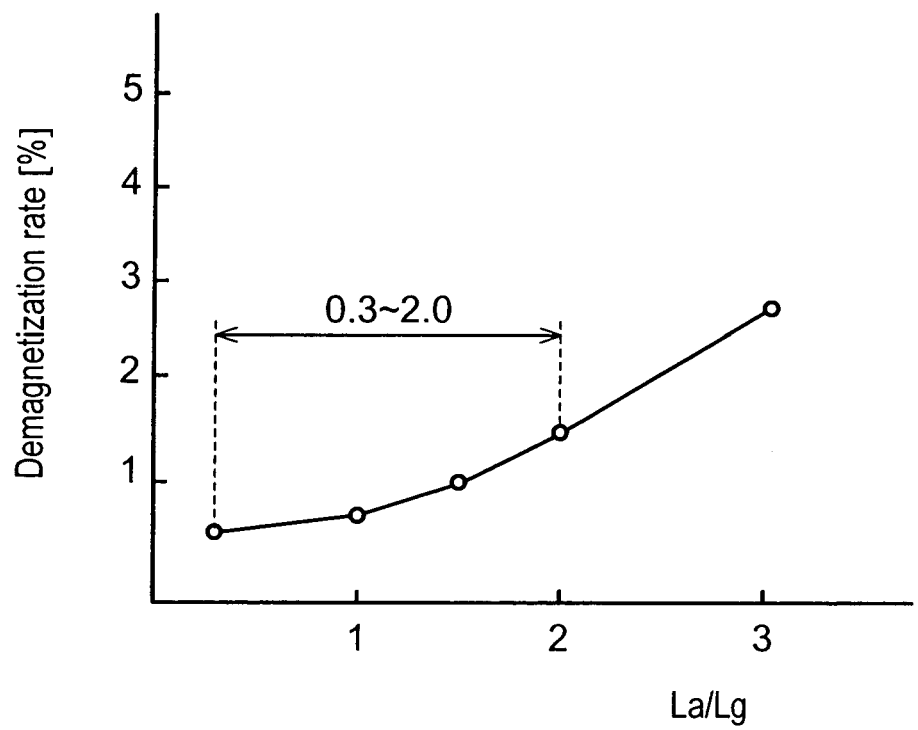
FIG. 2 is a graph illustrating a relation between the ratio of a slit clearance vs. an air-gap between stator and rotor and a demagnetization rate.

FIG. 2 illustrates a relation between La/Lg and a demagnetizing rate. In the conventional motor, La/Lg is set at greater than 2, and at that time, the demagnetization rate is greater than 1.5%, and this makes it difficult to produce an output. However, setting La/Lg at not greater than 2.0 lowers the demagnetization rate down to less than 1.5%, thereby obtaining the demagnetization rate practically needed. Since La is set at greater than 0.3 Lg, the leakage flux between teeth 4 and 4 does not grow too much. Further, there is no chance for stator 1 to be assembled with poor accuracy due to errors in mold of divided cores 3, for the errors could cause the teeth edges to interfere with each other.

Permanent magnets 6 made of ferrite magnets are less expensive than rare earth magnet. Indeed, magnets 6 are vulnerable to demagnetization, but the withstanding force against demagnetization can be increased as discussed above. Stator 1 is formed of divided cores 3, and then individual divided cores 3 can be wound independently and efficiently before being assembled into stator 1. This structure dramatically improves the productivity of stator 1. As a result, the cost can be substantially reduced.

Exemplary Embodiment 2

A permanent magnet synchronous motor in accordance with the second exemplary embodiment is demonstrated hereinafter with reference to FIG. 3 and FIG. 4. The like elements used in the first embodiment bear like reference marks, and the descriptions thereof are thus omitted here.

Figure 3:
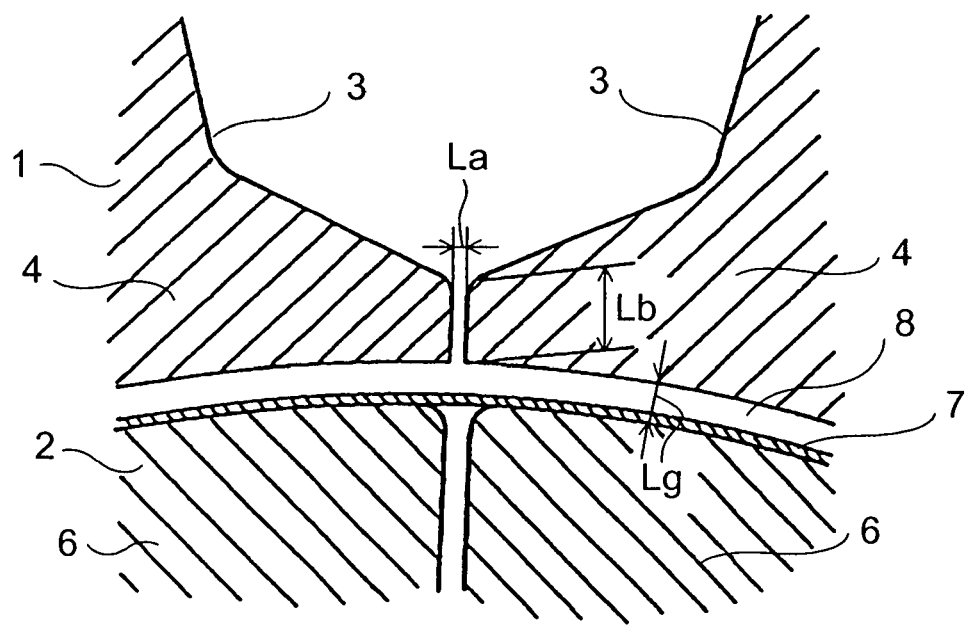
FIG. 3 is an enlarged view of an important part of a permanent magnet synchronous motor in accordance with a second exemplary embodiment of the present invention.

As illustrated in FIG. 3, La and Lb are set to meet the relations of:

$$0.3\ Lg < La < 2.0\ Lg, \text{ and } 2\ Lg < Lb < 5\ Lg,$$

where La=clearance between teeth 4 and 4,

Lb=depth of edge of tooth 4 of stator 1, and

Lg=air gap 8 between stator 1 and rotor 2.

In the construction discussed above, in addition to the arrangements done in the first embodiment, tooth depth Lb is set at greater than two times the air-gap Lg, thereby further restraining the leakage flux from flowing toward rotor 2. As a result, the withstanding force against the demagnetization can be increased. Since Lb is set at less than 5 Lg, the leakage flux shorting between teeth 4 and 4 does not grow too much, so that the motor output has no chance to lower.

Figure 4:
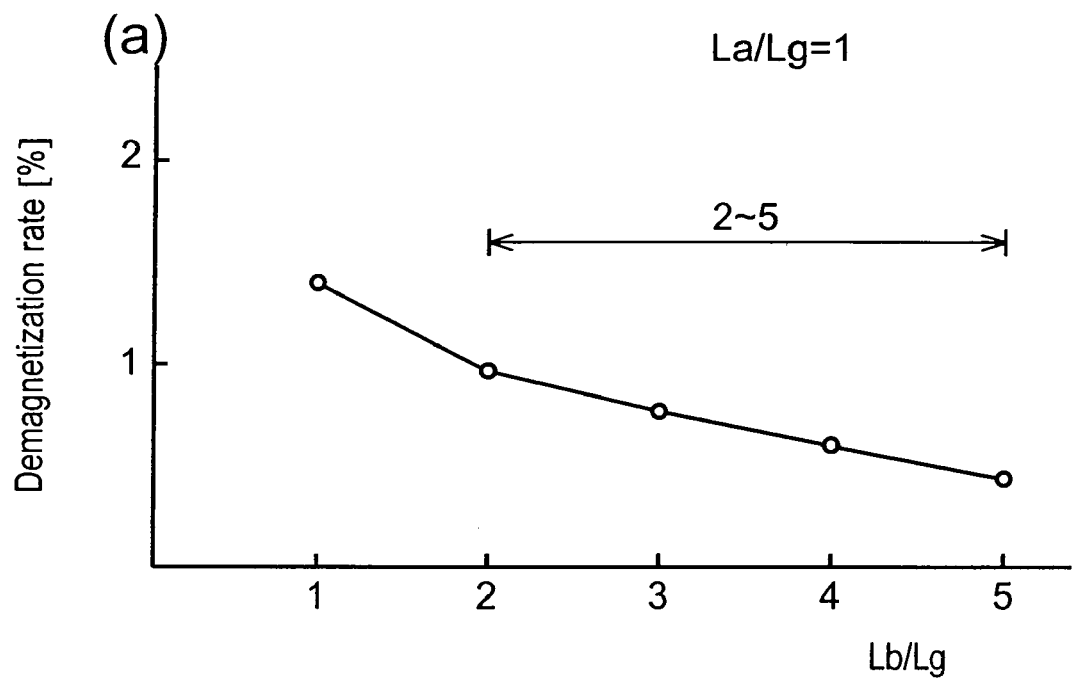
FIG. 4 is a graph concerning the second embodiment and illustrating a relation between a ratio of a depth of a tooth edge vs. an air gap between stator and rotor and a demagnetization rate, and a relation between the same ratio and a torque rate.
Figure 4:
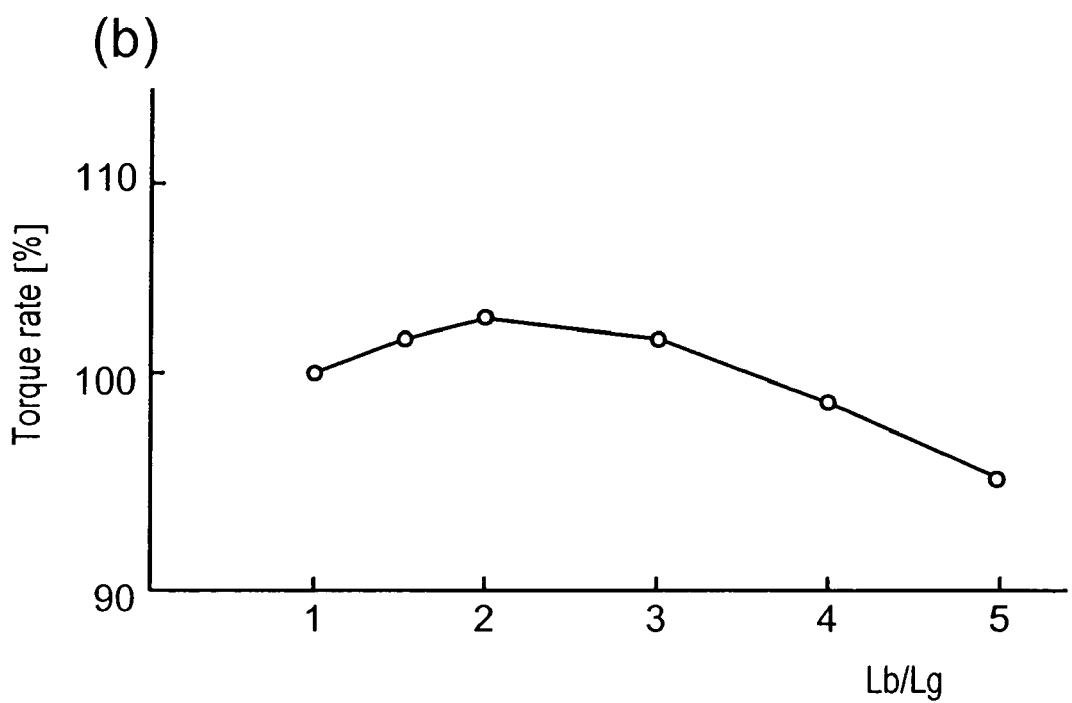

FIG. 4(*a*) and FIG. 4(*b*) illustrate the relation between Lb/Lg and demagnetization rate, and the relation between Lb/Lg and torque rate. In both cases, the ratio La/Lg is equal to one (1). As shown in FIG. 4(*a*), the demagnetization rate decreases at greater values of Lb/Lg, and as shown in FIG. 4(*b*) the torque rate decreases at greater values of Lb/Lg. Thus Lb/Lg is set at greater than 2 thereby reducing the demagnetization rate, and Lb/Lg is set at less than 5 thereby preventing the torque from lowering excessively.

The depth Lb of edges of teeth 4 of stator 1 is set at a greater value as discussed above, and this arrangement alone can also produce some effect.

Exemplary Embodiment 3

A permanent magnet synchronous motor in accordance with the third exemplary embodiment is demonstrated hereinafter with reference to FIG. 5.

Figure 5:
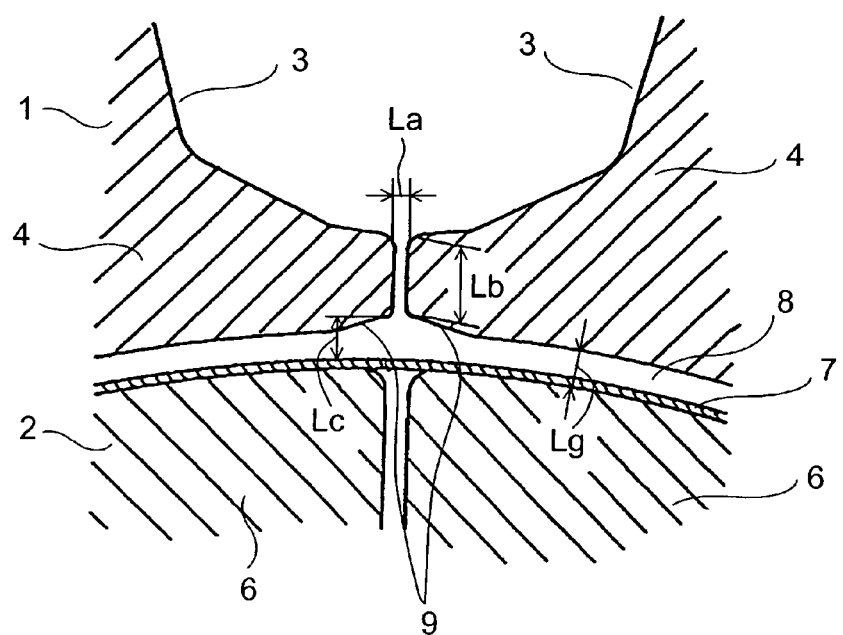
FIG. 5 is an enlarged view of an important part of a permanent magnet synchronous motor in accordance with a third exemplary embodiment of the present invention.

In FIG. 5, in addition to the arrangements done in the second embodiment shown in FIG. 3, parts of the edges facing each other of the adjacent teeth 4 and 4 are cut away on their rim sections that face (i.e., are closest to) rotor 2, and the cut-away section is called bevel 9. (A clearance between tooth edge 4 and rotor 2 is referred to as Lc.)

Bevel 9 can be provided only on the trailing-side edge with respect to the rotating direction of the rotor 2 out of the edges of teeth opposing each other.

The air gap on the edges of teeth 4 can be enlarged by providing bevel 9, and this can restrain the demagnetizing magnetic flux from flowing toward the rotor. As a result, the same effect is obtainable.

At the edge of tooth 4 where the rim side facing the rotor 2 has been cut away, the other side facing away (farthest) from the rotor 2 protrudes so that the depth of the tooth edge is maintained, and this can restrain the demagnetizing magnetic flux from running toward rotor 2. As a result, the withstanding force against the demagnetization can be further enhanced. Alternatively, a bevel 9 simply provided on the edge of teeth 4 can also produce some effect.

Exemplary Embodiment 4

A permanent magnet synchronous motor in accordance with the fourth exemplary embodiment is demonstrated hereinafter with reference to FIG. 6 and FIG. 7. In the previous embodiments 1–3, the shape of teeth 4 of stator 1 is modified, thereby restraining the demagnetizing magnetic flux from flowing toward rotor 2. In the following embodiments, demagnetizing magnetic flux-traveling through rotor 2—is modified so as not to travel through permanent magnets 6, so that withstanding force against demagnetization is increased.

Figure 6:
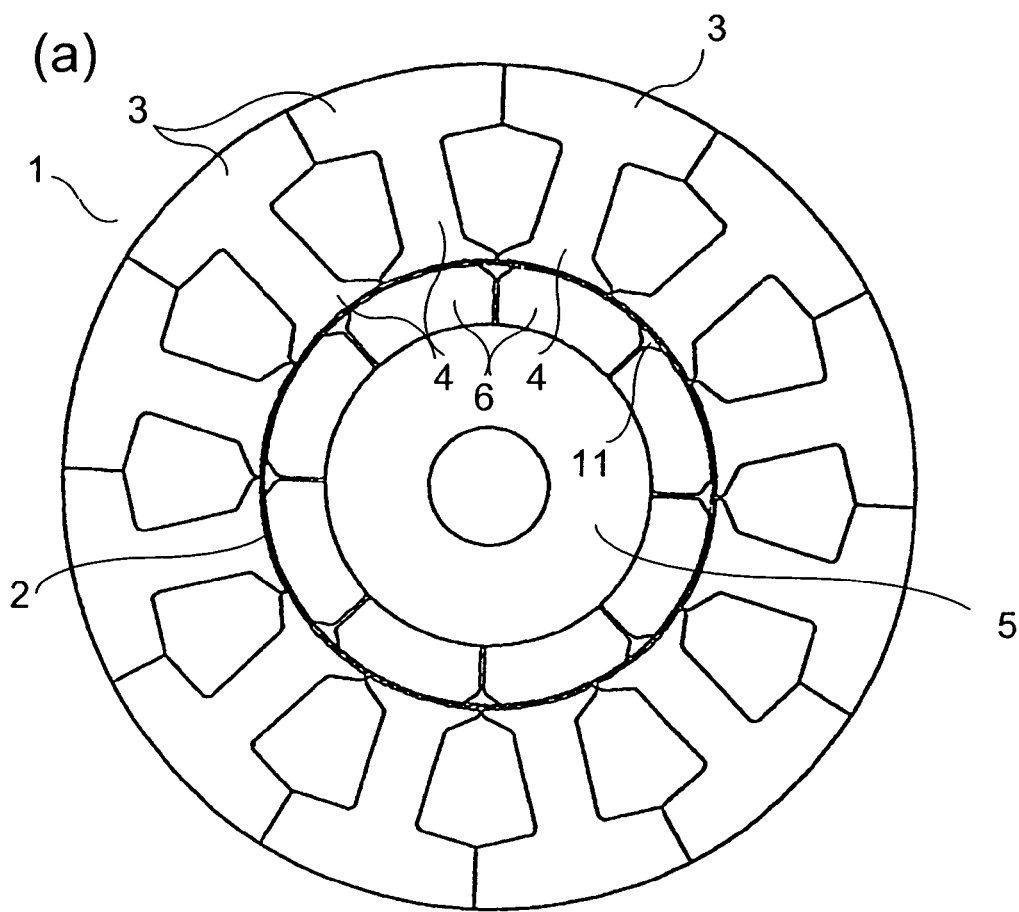
FIG. 6(a) is a cross section of a permanent magnet synchronous motor in accordance with a fourth exemplary embodiment of the present invention.
FIG. 6(b) is an enlarged view of an important part of the motor.
Figure 6:
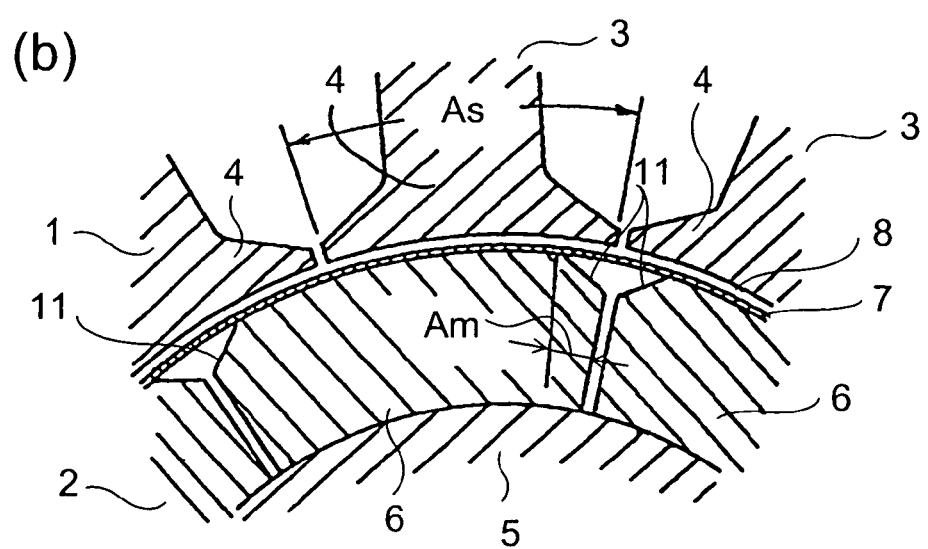
Figure 7:
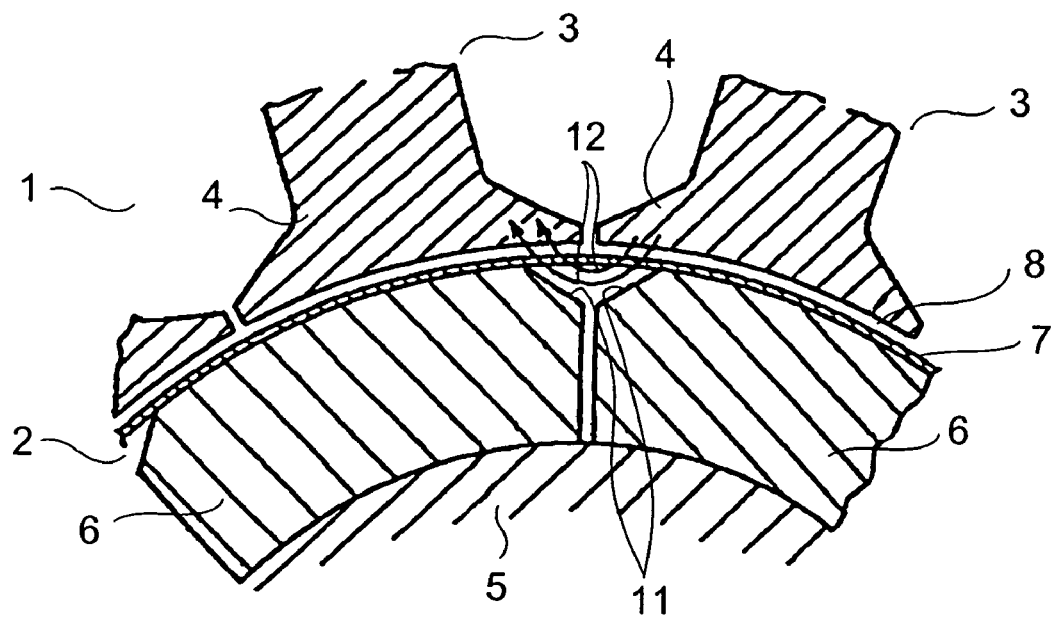
FIG. 7 illustrates an operation of the fourth embodiment.

In FIG. 6, bevels 11 are formed on both edges of respective permanent magnets 6, where the edges on the outer rim side are used for bevels 11. Each bevel 11 is defined as shown in FIG. 6(*b*): Opening angle "Am" of bevel 11 with regard to the rotor center is set to meet this relation;

$$(\tfrac{1}{10})As < Am < (\tfrac{1}{4})As$$

where "As" is an opening angle of tooth 4.

This structure, i.e., providing bevels 11 on both edges of permanent magnet 6, allows demagnetizing magnetic field 12 to travel through the resulting open space even if demagnetization magnetic field 12 protruding toward rotor 2 is produced between the edges of adjacent teeth 4. Therefore, demagnetization magnetic field 12 does not demagnetize permanent magnet 6, and the withstanding force against the demagnetization of magnet 6 is thus increased. When "Am" is less than ($\tfrac{1}{10}$)As, the effect discussed above cannot be produced, and when "Am" is greater than ($\tfrac{1}{4}$)As, the motor produces lower output or greater cogging torque.

Exemplary Embodiment 5

Figure 8:
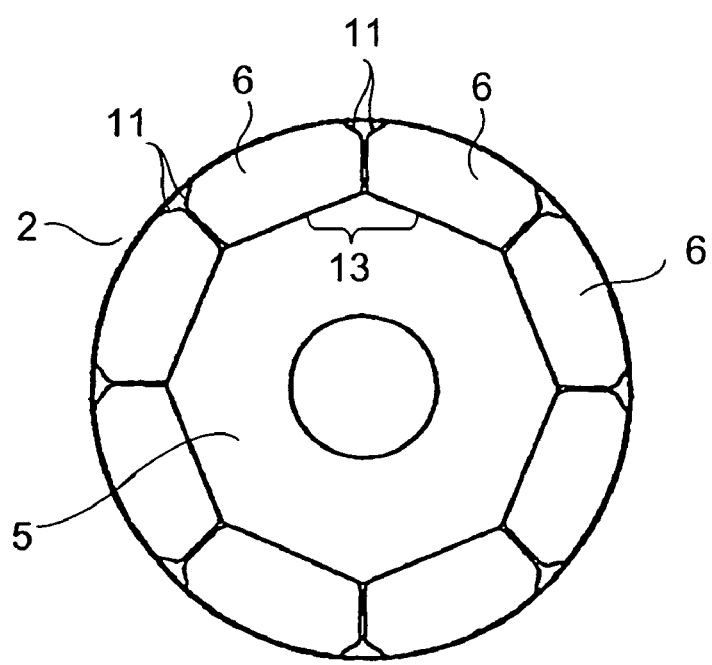
FIG. 8 is a cross section of a permanent magnet synchronous motor in accordance with a fifth exemplary embodiment of the present invention.

A permanent magnet synchronous motor in accordance with the fifth exemplary embodiment is demonstrated hereinafter with reference to FIG. 8. In embodiment 4, magnet 6 having an inner wall with an even depth with regard to the arc around the shaft center of rotor 2 is used. In this fifth embodiment, magnet 6 having the inner wall with a flat face 13 is used. This structure increases the depth of center part of magnet 6 in the rim (radial) direction, thereby increasing withstanding force at the center of magnet 6 against demagnetization.

Exemplary Embodiment 6

A permanent magnet synchronous motor in accordance with the sixth exemplary embodiment is demonstrated hereinafter with reference to FIG. 9. In the previous embodiments 4 and 5, permanent magnets 6 are mounted on the outer wall of rotor core 5, thereby forming rotor 2. In the following embodiments including this sixth embodiment, permanent magnets 6 are buried in rotor core 5.

In FIGS. 9(a), 9(b) and 9(c), bevels 11 are formed on both edges of permanent magnet 6, where the edges on the outer rim side are used for bevels 11. This magnet 6 is buried in rotor core 5 along its outer rim. Further, as shown in detail in FIG. 9(d), recess sections 14 are recessed into the outer wall of rotor core 5 so that the recessed positions can correspond to respective open spaces created by bevels 11. Permanent magnets 6 shown in FIG. 9(a) have an even depth with regard to the arcs around the rotor center. Permanent magnets 6 shown in FIG. 9(b) have a flat face 13 on their inner wall facing the radial direction of the rotor, so that each magnet 6 has a greater depth at its center. FIG. 9(c) illustrates rotor 2 having four poles, where each permanent magnet 6 has an inner wall shaping an arc with regard to the rotor center and an outer wall shaping another arc with regard to a center eccentric from the rotor-core-center outwardly in the radial direction. This eccentric arced face 15 protrudes and both end sections of face 15 taper in the radial direction, so that both the end sections function as bevels 11.

In this embodiment, bevel 11 or an equivalent section with the same function bevel 11 is formed on both ends of each permanent magnet 6, so that the same effect is produced as the previous embodiments 4 and 5 did. Further, since this embodiment adopts interior magnets 6, if the outer wall of rotor core 5 is left in a circular form, ferromagnetic fields exist outside the open space created bevels 11 or the equivalent section whereby leaked magnetic-flux travels through this ferromagnetic field and shorts the magnetic circuit. However, recess section 14 is provided in this embodiment, and this prevents the leakage magnetic-flux from being shorted. As a result, this structure prevents, without fail, the motor from lowering its efficiency.

Exemplary Embodiment 7

Figure 10:
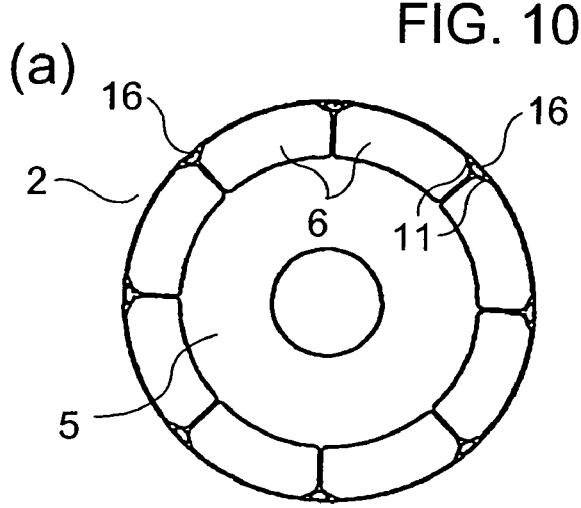
FIG. 10 illustrates a permanent magnet synchronous motor in accordance with a seventh exemplary embodiment.
Figure 10:
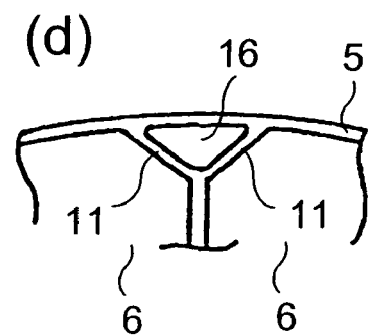
Figure 10:
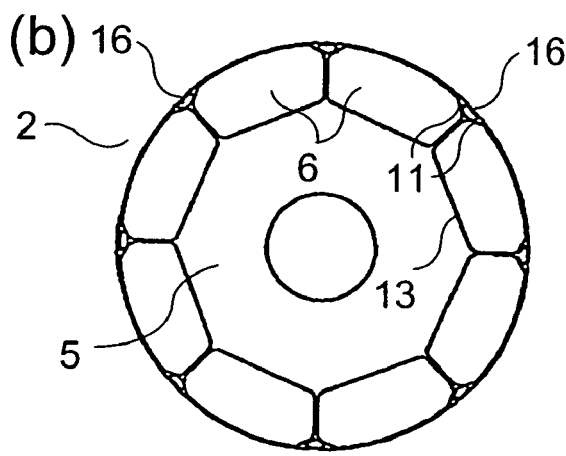
Figure 10:
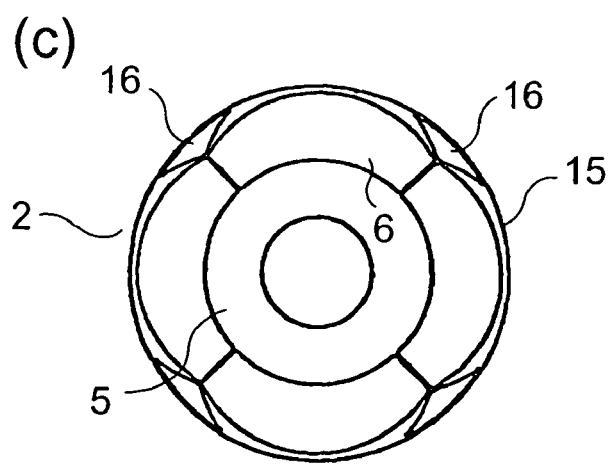

A permanent magnet synchronous motor in accordance with the seventh exemplary embodiment is demonstrated hereinafter with reference to FIG. 10 through FIG. 12. The previous embodiment 6 describes the example of forming recess section 14 corresponding to the open space formed by bevels 11. In this embodiment, as shown in FIG. 10(a) through FIG. 10(c), the outer wall of rotor core 5 forms a cylindrical face, and as FIG. 10(d) illustrates in detail, spacer 16 is formed at the place where open space created by bevels 11 would have been provided. Spacer 16 can be hollow, or it can be filled with resin or non-magnetic metal in order to maintain the strength of rotor 2.

Permanent magnets 6 shown in FIG. 10(a) have an even depth with regard to the arcs around the rotor center. Permanent magnets 6 shown in FIG. 10(b) have a flat face 13 on their inner wall facing the radial direction of the rotor, so that each magnet 6 has a greater depth at its center. FIG. 10(c) illustrates rotor 2 having four poles, where each permanent magnet 6 has an inner wall shaping an arc with regard to the rotor center and an outer wall shaping another arc with regard to a center eccentric from the rotor-core-center outwardly in the radial direction. This eccentric arced face 15 protrudes and both end sections of face 15 taper in a radial direction, so that both the end sections function as open spaces 11.

Figure 11:
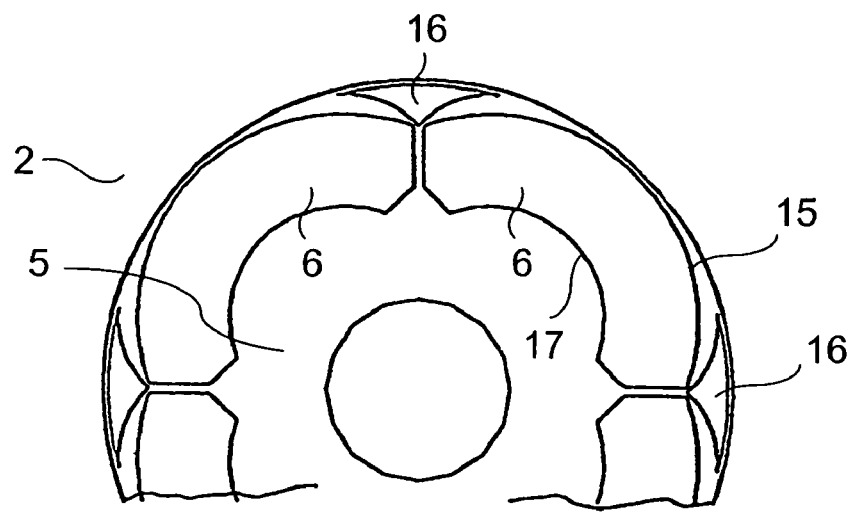
FIG. 11 is a cross sectional enlarged view of the modification shown in FIG. 10(c).
Figure 12:
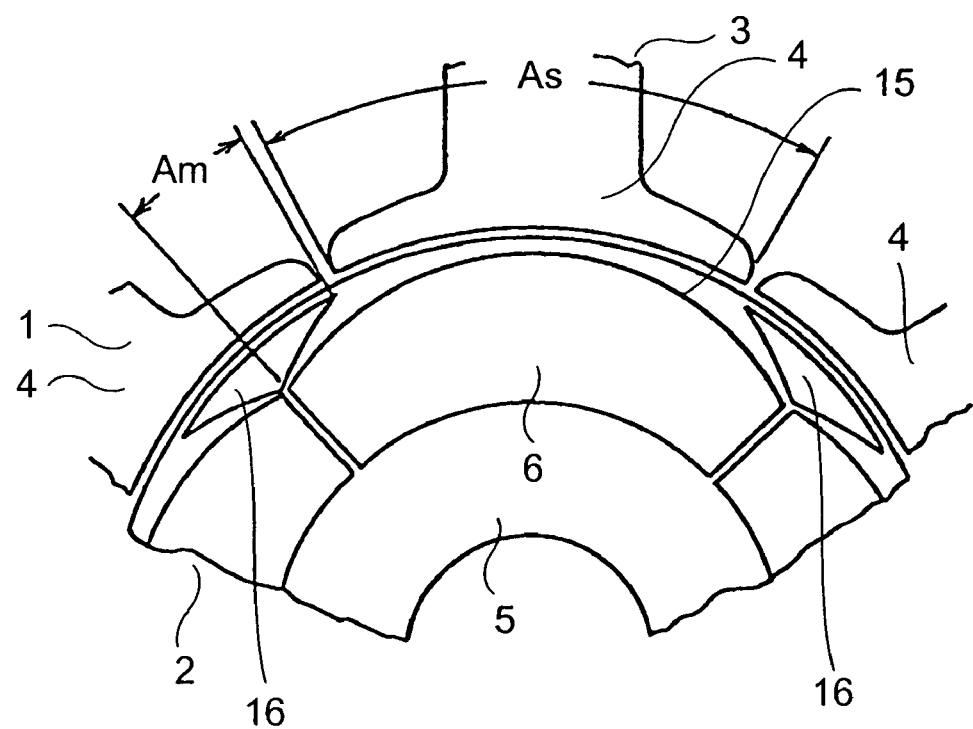
FIG. 12 illustrates an operation of the seventh embodiment.

Each of the permanent magnets 6 shown in FIG. 11 is modified from magnet 6 shown in FIG. 10(c) in that the inner wall facing the radial direction forms an arced face 17 having the same eccentric center as arced face 15.

In this embodiment, opening angle "Am" of spacer 16 is set to meet this relation;

$$(1/10)As < Am < (1/4)As,$$

where "As" is an opening angle of tooth 4.

An opening angle of the space where spacer 16 does not exist is set at about equal to the opening angle of tooth 4, i.e., within the range of (1.0–1.4)As.

Figure 9:
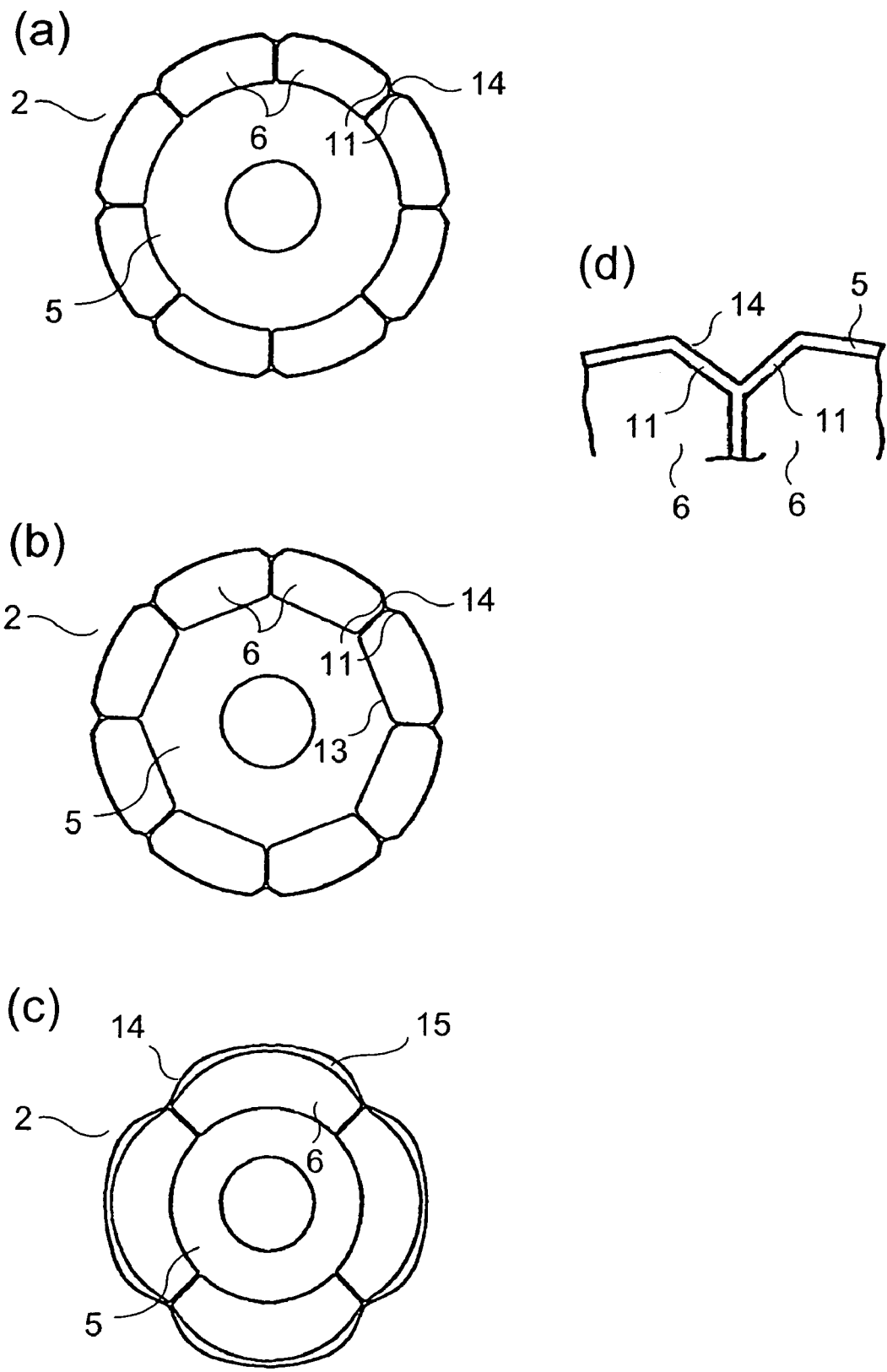
FIG. 9 illustrates a permanent magnet synchronous motor in accordance with a sixth exemplary embodiment.

This structure, in which recess section 14 is replaced with spacer 16, produces the same effect as the embodiment 6 does as illustrated in FIG. 9. When the opening angle "Am" of spacer 16 is less than (1/10)As, the effect discussed above cannot be produced, and when "Am" is greater than (1/4)As, the motor produces lower output or greater cogging torque.

Exemplary Embodiment 8

Figure 13:
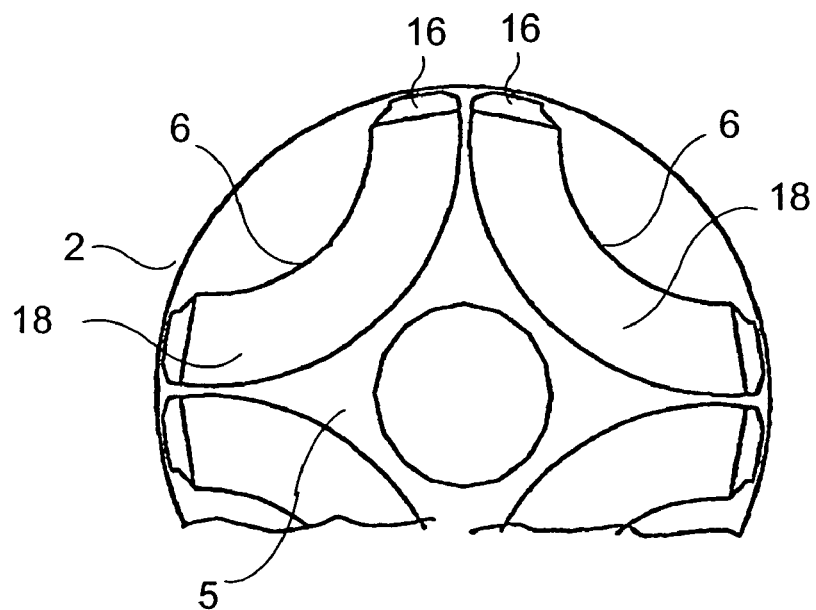
FIG. 13 is a cross section of a permanent magnet synchronous motor in accordance with an eighth exemplary embodiment of the present invention.

A permanent magnet synchronous motor in accordance with the eighth exemplary embodiment is demonstrated hereinafter with reference to FIG. 13 through FIG. 15. In this embodiment, permanent magnet 6 to be buried into rotor 2 has its curvature-center outside rotor 2 in the radial direction, i.e., a reversely arced permanent magnet 18 is used as shown in FIG. 13. Magnet ends facing the outer rim of rotor 2 are situated inside the rotor an appropriate distance from the outer rim, and spacer 16 is formed in rotor core 5 so that each end of magnet 18 can face slit 16.

Figure 14:
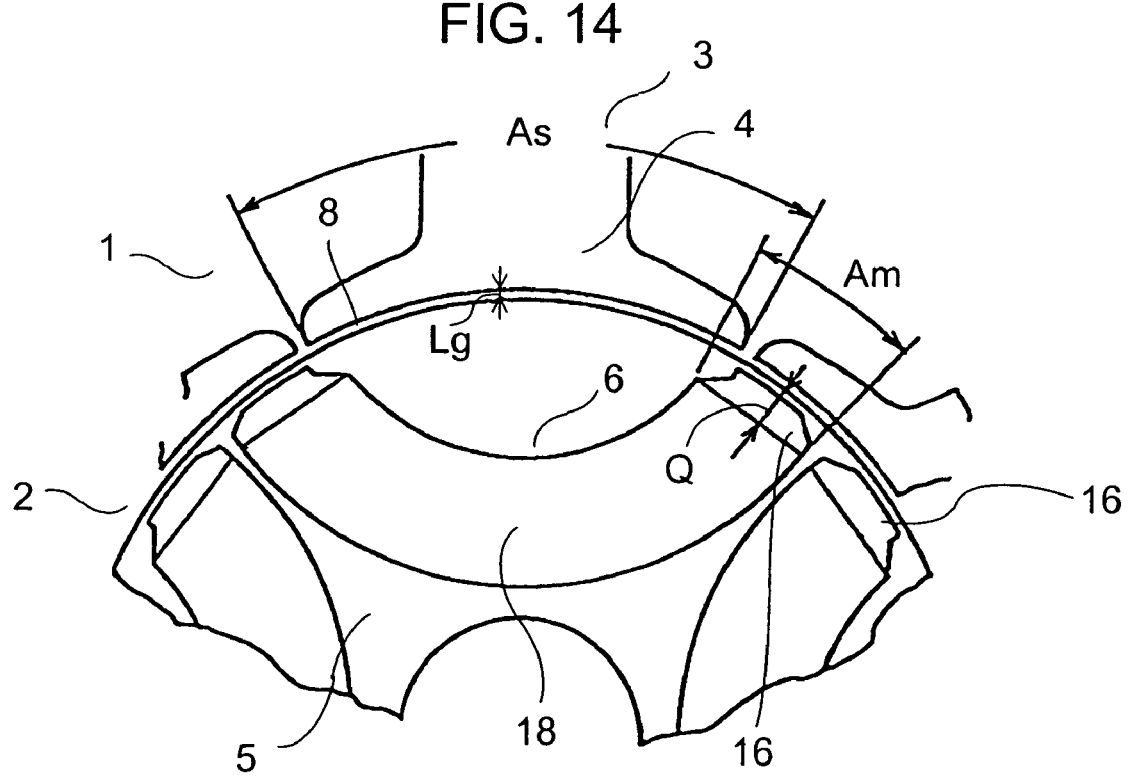
FIG. 14 illustrates an operation of the eighth embodiment.
Figure 15:
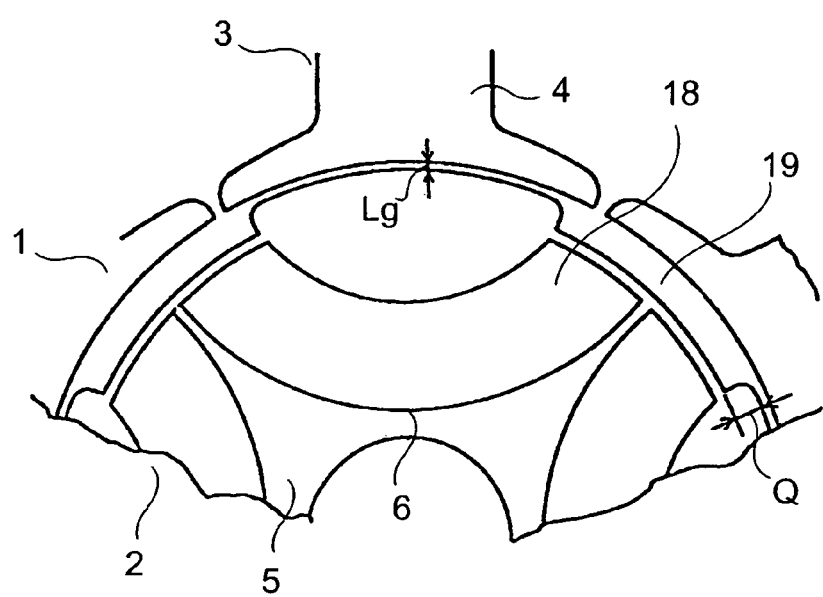
FIG. 15 illustrates an operation of a modification in the eighth embodiment.

As shown in FIG. 14, the relation of Lg<Q<3 Lg is established, where Q=distance between the end of permanent magnet 18 and the outer rim of rotor core 5; and Lg=air gap between stator 1 and rotor 2.

If Q is less than Lg, demagnetizing magnetic flux is not substantially blocked from traveling to permanent magnet 18. If Q is greater than 3 Lg, the magnetic field produced by magnet 18 is weakened, so that the motor produces lower output or greater cogging torque due to abrupt change of the magnetic field. An opening angle "Am" of spacer 16 with regard to rotor center-angle "Am" being over an end of permanent magnet 18 is set to meet this relation;

$$(1/10)As < Am < (1/4)As$$

where "As" is an opening angle of tooth 4.

When the opening angle "Am" of spacer 16 is less than (1/10)As, the effect discussed above cannot be produced, and when "Am" is greater than (1/4)As, the motor produces lower output or greater cogging torque.

FIG. 13 and FIG. 14 illustrate an example where spacer 16 is formed within the outer rim of rotor core 5. Spacer 16 can be replaced with recess section 19 as shown in FIG. 15. In this case, a size of cut-away section 19 is determined in the same manner as discussed above.

Exemplary Embodiment 9

Figure 21:
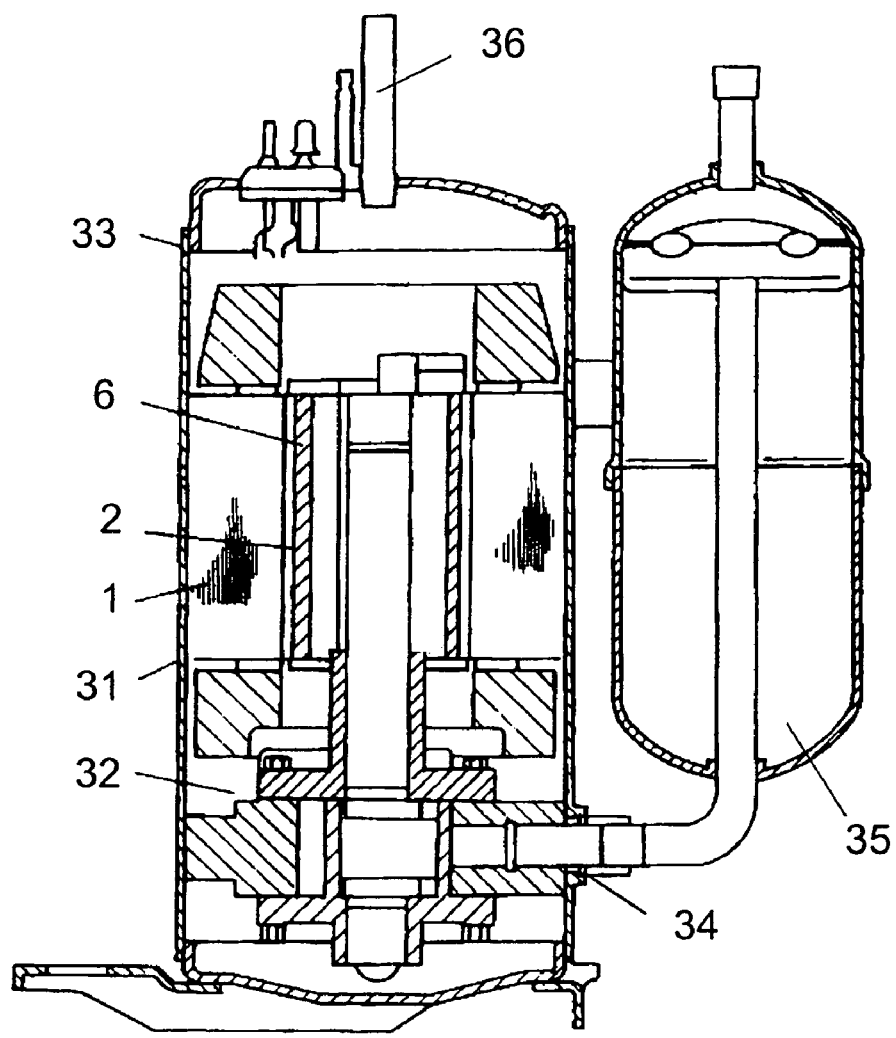
FIG. 21 illustrates a compressor used in an air-conditioner or an electric refrigerator.

As shown in FIG. 21, motor 31 comprises stator 1, rotor 2 and permanent magnet 6 disposed in rotor 2. The construction of motor 31 can be the same as those used in any of embodiments 1 through 8.

Motor 31 and compressor 32 are disposed in airtight container 33. Accumulator 35 is added to sucking pipe 34 of compressor 32, and discharging pipe 36 is disposed at an upper section of container 33. The compressor is thus connected in this manner. The compressor of the present invention is realized at a low cost and benefits from the advantages of the motor of the present invention because the advantages of the motor 31 described in the previous embodiments can be used.

Figure 16:
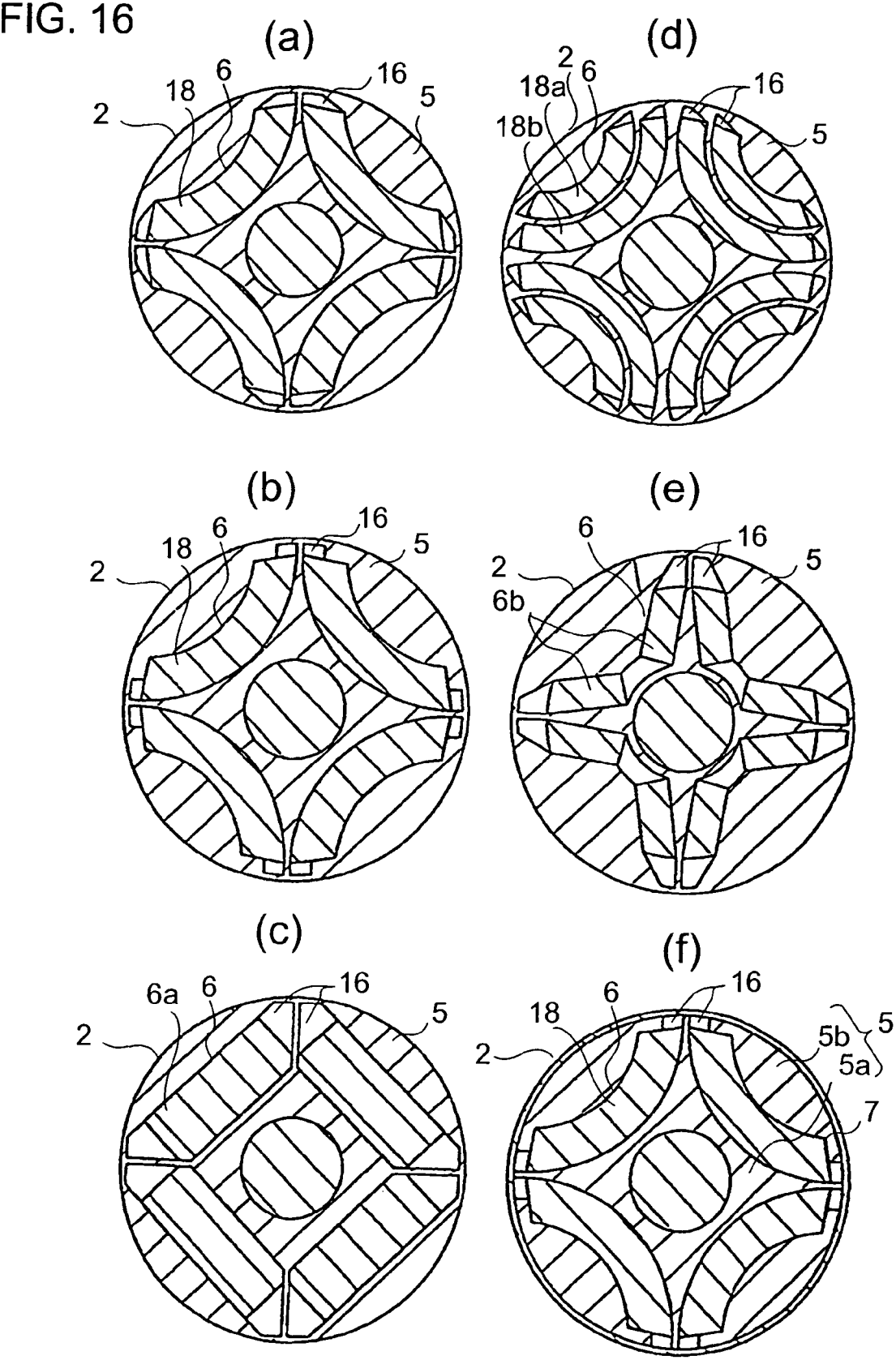
FIG. 16 shows cross sectional views of embodiments other than the embodiments discussed above.
Figure 17:
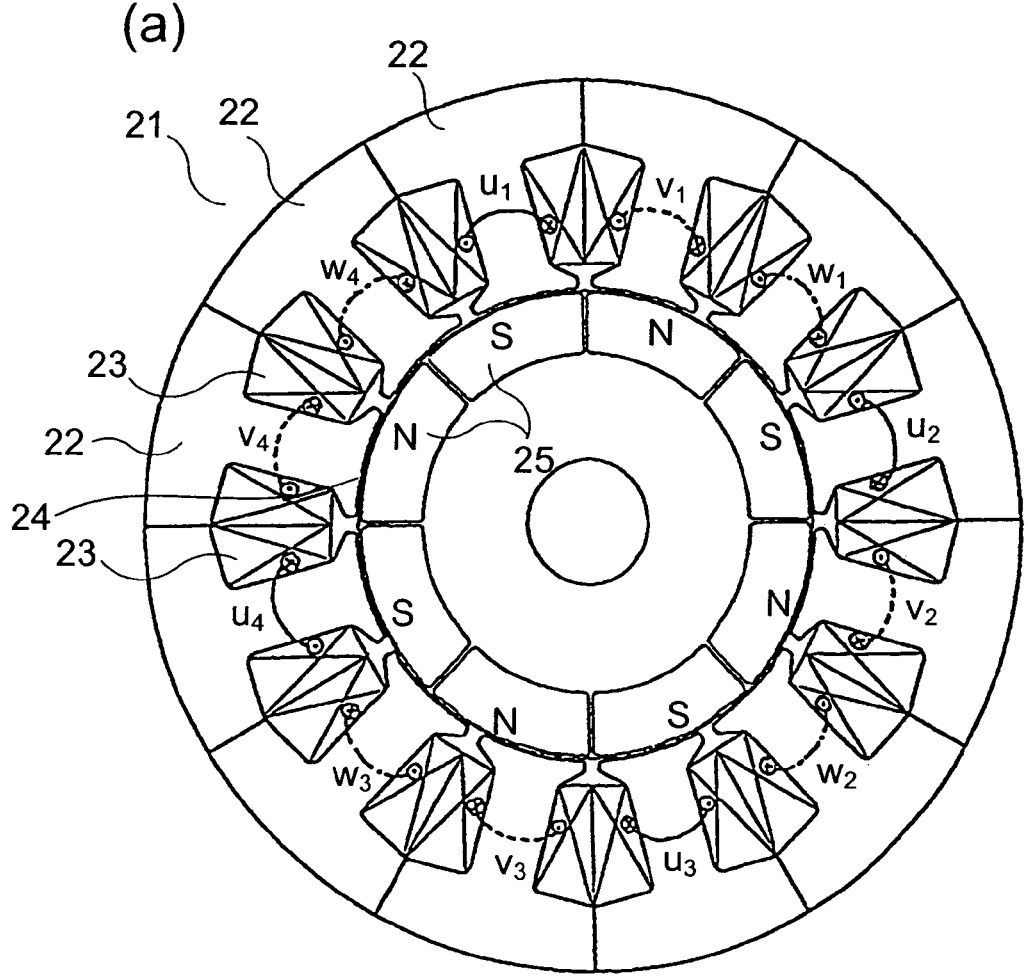
FIG. 17 illustrates a construction of a conventional permanent magnet synchronous motor.
Figure 17:
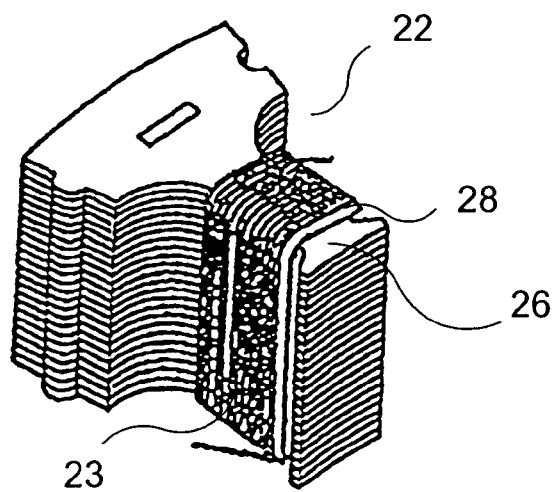
Figure 18:
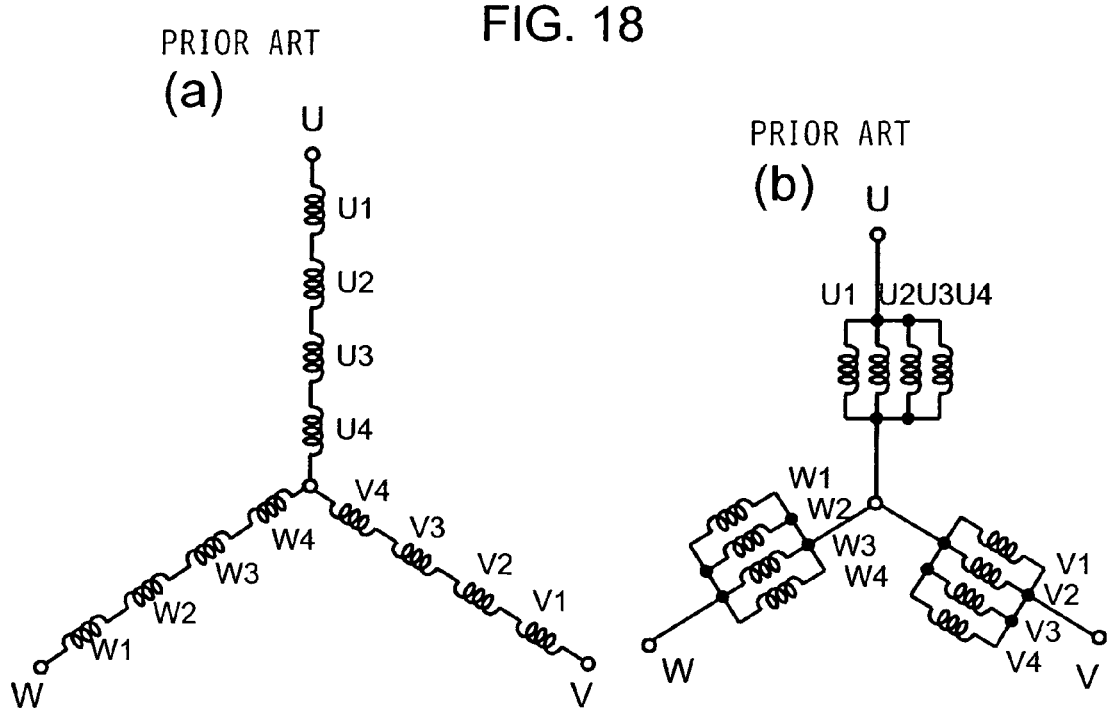
FIG. 18 illustrates coil-couplings of the conventional motor.
Figure 19:
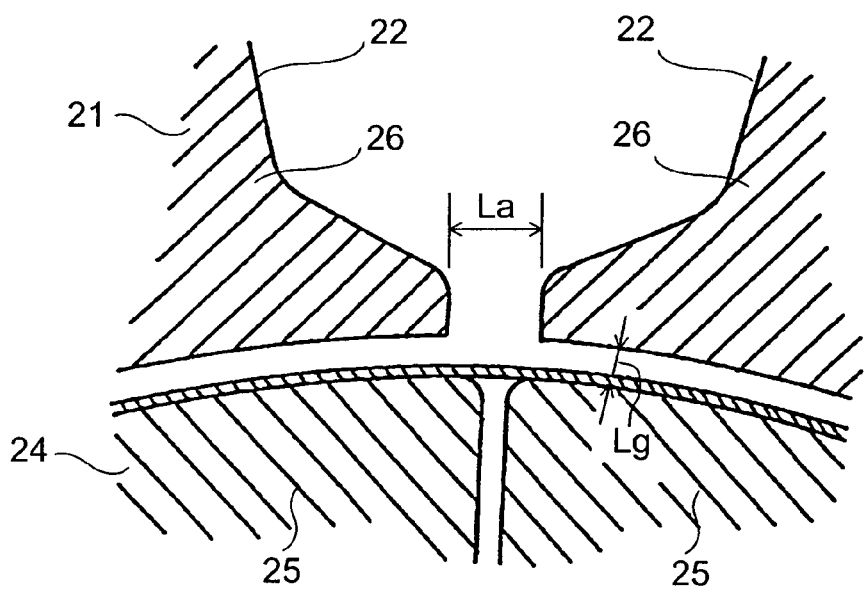
FIG. 19 is a cross sectional enlarged view of an important part of the conventional motor.
Figure 20:
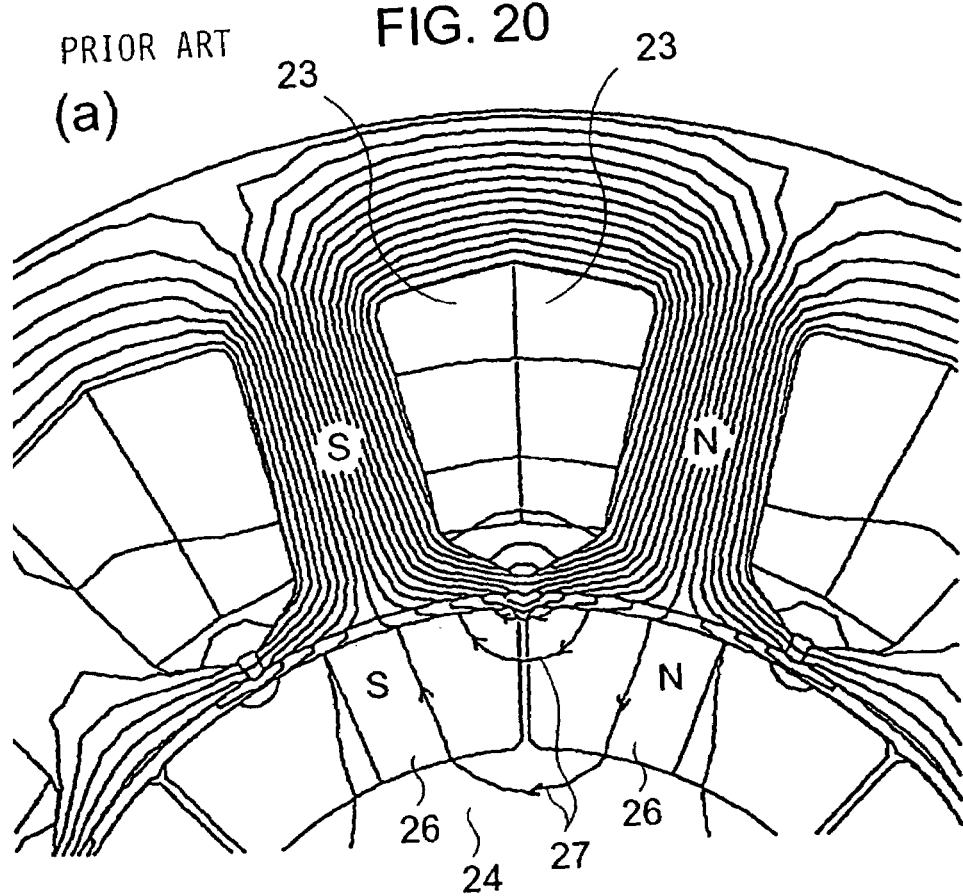
FIG. 20 illustrates demagnetization in the conventional motor.
Figure 20:
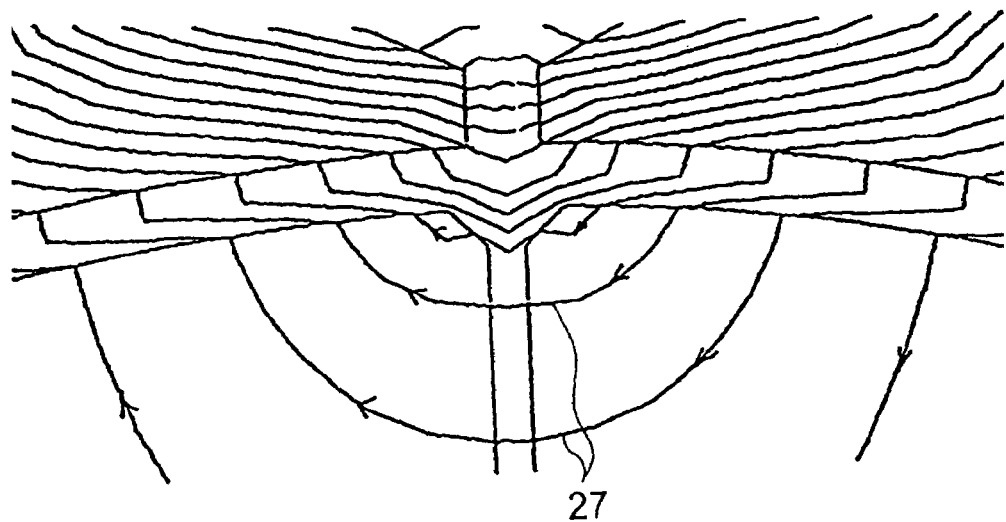

In addition, FIG. 16 illustrates embodiments of rotors having interior-permanent-magnets other than the embodiments discussed above. FIG. 16(a) and FIG. 16(b) illustrate the embodiment modified from the embodiment 8 regarding the opening angle and shape of spacer 16. The embodiment shown in FIG. 16(c) uses permanent magnet 6 made of plate-type magnet 6a. FIG. 16(d) illustrates permanent magnet 6 comprising reversely arced permanent magnets 18a and 18b disposed in multistage, parallel with each other, in the radial direction. Spacers 16 are formed at respective ends of reversely arced permanent magnets 18a and 18b. FIG. 16(e) illustrates an embodiment where permanent magnet 6 is formed of a pair of plate-type magnets 6b, the pair of plates form an angle tapering outward in the radial direction. FIG. 16(f) illustrates an embodiment where reversely arced permanent magnets 18 are used. Rotor core 5 comprises rotor core body 5a and rotor core cap 5b. Rotor core body 5a arranges magnets 18 to surround body 5a and forms a star-like shape in cross sectional view. Rotor core cap 5b and body 5a hold magnet 18 in between. Hollow thin-cylinder 7 is fit to outer wall of rotor core 5 thereby maintaining the strength against centrifugal force. Spacer 16 is formed at a place surrounded by the end of body 5a, end of cap 5b and cylinder 7.

The embodiments previously discussed describe the permanent magnet synchronous motor in a sensor-less operation. However, those embodiments can be applied to the motor having a sensor with the same effect, i.e. demagnetization is restrained.

INDUSTRIAL APPLICABILITY

In a permanent magnet synchronous motor of the present invention with a stator having concentrated windings, the following relation is established: 0.3 Lg<La≦2.0 Lg, where La is a clearance between respective teeth, and Lg is an air gap between the stator and rotor. Since the clearance between teeth is set at not more than two times the air gap Lg, demagnetizing magnetic flux is restrained from flowing toward the rotor. Further when polarities of the coil and rotor oppose each other, the rotor magnets are not easily subjected to the demagnetizing magnetic field. As a result, the withstanding force against the demagnetization is enhanced.

Another relation such as 2 Lg<Lb<5 Lg is established so that the demagnetizing magnetic flux can flow toward the teeth and can be restrained from flowing toward the rotor, where Lg is an air gap between the stator and rotor. As a result, the same effect as discussed above can be expected.

Further, when the two relations discussed above are satisfied, the greater withstanding force against demagnetization is obtainable.

In an edge of each tooth of the stator, i.e., the trailing-side edge with respect to the rotating direction of the rotor out of the edges of teeth opposing each other, or both of these edges, the side facing the rotor is cut away so that an air gap on the tooth edge can be enlarged. This can restrain the demagnetizing magnetic flux from flowing toward the rotor. As a result, the same effect discussed above is obtainable. Further, in this case, at the edge where the rim side facing the rotor has been cut away, the other side of the edge farthest from the rotor protrudes so that the depth of the tooth edge is maintained, and this can restrain the demagnetizing magnetic flux from running toward the rotor. As a result, the withstanding force against the demagnetization can be further enhanced. When the three conditions discussed above are satisfied, the greater withstanding force against the demagnetization is obtainable.

When the permanent magnets of the rotor are made of ferrite magnet, which is less expensive than rare earth magnet and more vulnerable to demagnetization, the structure discussed above can enhance the withstanding force of the inexpensive permanent magnets against the demagnetization. Therefore, an outstanding effect can be produced in this case. The stator formed by the divided cores realizes independent and efficient winding on respective divided cores before they are assembled into the stator. This can substantially increase the productivity and lower the cost. If this structure is applied to the motor driven by the sensor-less mechanism, an outstanding effect is expected because the sensor-less operation, in general, is vulnerable to demagnetization. In addition to the effects discussed above, when this permanent magnet synchronous motor is employed in compressors of air-conditioners or electric refrigerators, substantial effects are obtainable by lowering the costs of these appliances.

In the permanent magnet synchronous motor having a stator of the concentrated winding method and allowing its current-phase to be controlled in a sensor-less manner, the withstanding force against the demagnetization can be increased by the following method. Both ends of the permanent magnet buried inside the rotor along its rim are tapered at their outer wall toward inside in the radial direction and thus form recessed section. Therefore, when the coil counteracts the polarity of the rotor and then the adjacent teeth produce demagnetizing field between the teeth toward the rotor, the permanent magnet is not easily subjected to the demagnetizing field.

In that case, an opening angle of the recessed section with regard to the rotor center is referred to as "Am", and an opening angle of stator teeth is referred to as "As", then "Am" is set at greater than ($\frac{1}{10}$)As, thereby producing the same effect discussed above. When "Am" is set at less than ($\frac{1}{4}$)As, the motor is restrained from producing the lower output due to lower utilization factor of magnetic flux produced by the permanent magnet as well as from producing the greater cogging torque.

An inner face of the permanent magnet directing the radial direction forms a flat face so that the depth at the center of the magnet becomes greater. As a result, the withstanding force of the magnet center against the demagnetization further increases.

In the case that the permanent magnets are mounted on the outer wall of the rotor core, the recessed sections are formed at the place corresponding to respective open spaces which are produced by cutting away both the ends of the permanent magnet in the rim direction. This structure can be realized through simple processes, and allows the motor to increase the withstanding force against demagnetization, prevent the lower output and restraint cogging torque.

In the case that the rotor uses interior permanent magnets, i.e. the magnets are buried in the rotor core along its rim, cut-away sections or spacers are formed at the place corresponding to both edges, of the permanent magnet. These cut-away spacers or slits can thus prevent the leaking magnetic flux from traveling through a place of the rotor core made of ferromagnetic material, the place corresponding to the recessed section, and thus shorting of the place can be avoided. As a result, this structure allows the motor to avoid lowering the efficiency without fail.

In the case of the interior permanent magnets buried in the rotor core along its rim, and the magnet has its curvature center outside of the rotor in the radial direction and forms a reverse arc, the same effect as discussed above is obtainable through the following method. Both the ends of the permanent magnet are situated inside of the rotor rim, where the ends of magnet face to the rotor rim, and cut-away sections or spacers are formed on the rotor core at the place facing to those ends.

In that case, a distance between the end of permanent magnet and the outer rim of rotor is referred to as "Q", and an air-gap between stator and rotor is referred to as "Lg". "Q" is set at greater than "Lg" thereby obtaining the same effect discussed above without fail. "Q" is set at less than 3 Lg, thereby allowing the motor to avoid producing lower output or greater cogging torque produced by an abrupt change of the magnetic field. An opening angle "Am" over the cut-away section or the spacer facing one end of the permanent magnet with regard to the rotor center and an opening angle "As" of stator teeth are adjusted to meet the following relation: "Am" is set at greater than ($\frac{1}{10}$)As thereby obtaining the same effect discussed above without fail. "Am" is set at less than ($\frac{1}{4}$)As thereby allowing the motor to avoid producing lower output or greater cogging torque.

When these embodiments are applied to the motor in a sensor-less operation, the structure can be realized inexpensively and yet increase the withstanding force against the demagnetization, thus an outstanding effect is produced. When this permanent magnet synchronous motor is employed in compressors of air-conditioners or electric refrigerators, substantial effects are obtainable because the costs of these appliances can be lowered.

What is claimed is:

1. A permanent magnet synchronous motor comprising:
   a rotor; and
   a stator having teeth and concentrated windings such that adjacent teeth have different polarities, each of said teeth having a leading-side edge and a trailing-side edge with respect to a rotation of said rotor, at least one of said leading-side edge and said trailing-side edge having a bevel formed at a first end closest to said rotor and having a protrusion formed at a second end farthest from said rotor such that each side edge of each tooth is maintained at a substantially constant depth.

2. The motor of claim 1, wherein said rotor includes a ferrite permanent magnet.

3. The motor of claim 1, wherein said stator includes a divided core.

4. The motor of claim 1, wherein said rotor and said stator are adapted to operate sensor-free.

5. An apparatus comprising:
   a compressor in one of an air-conditioner and electric refrigerator; and
   the motor of claim 1 for driving said compressor.

* * * * *